United States Patent [19]

Nedderman, Jr.

[11] Patent Number: 5,533,699

[45] Date of Patent: Jul. 9, 1996

[54] ADJUSTABLE TWO-AXIS INSTRUMENT MOUNT

[75] Inventor: William H. Nedderman, Jr., Newport, R.I.

[73] Assignee: The United States of America as represented by the Secretary of the Navy, Washington, D.C.

[21] Appl. No.: 349,656

[22] Filed: Dec. 5, 1994

[51] Int. Cl.⁶ ............................................. E04G 3/00
[52] U.S. Cl. ........................... 248/278.1; 248/184.1; 248/188.4; 248/913
[58] Field of Search ................... 248/184.1, 188.4, 248/278.1, 603, 638, 650, 660, 661, 664, 913, 626, 629

[56] References Cited

U.S. PATENT DOCUMENTS

| | | | |
|---|---|---|---|
| 2,454,538 | 11/1948 | Bazley et al. | 248/626 X |
| 2,990,859 | 7/1961 | Ruben | 248/660 X |
| 3,596,863 | 8/1971 | Kaspareck | 248/278.1 |
| 4,667,922 | 5/1987 | Cutburth et al. | 248/664 |
| 5,082,223 | 1/1992 | Ording et al. | 248/278.1 X |
| 5,090,650 | 2/1992 | Donaldson et al. | 248/278.1 X |
| 5,427,349 | 6/1995 | Obrecht | 248/660 X |
| 5,460,348 | 10/1995 | Cox | 248/638 |

*Primary Examiner*—Leslie A. Braun
*Assistant Examiner*—Richard M. Smith
*Attorney, Agent, or Firm*—Michael J. McGowan; Prithvi C. Lall; Michael F. Oglo

[57] ABSTRACT

A two-axis adjustable instrument mount having a fixed base plate, an intermediate plate and an instrument mount plate. The intermediate plate is attached to the base plate by a three-point mount in the shape of an isosceles triangle. The two mounting points corresponding to the base of the triangle include hinge flex plates fixed to the base plate by means of rigid stand-offs. The flex plates are also fixed to the edge of the intermediate plate. The third mounting point corresponding to the apex of the triangle has a resilient block between the intermediate plate and the base plate. A threaded fastener passes through the resilient block and secures the intermediate plate to the base plate. Tightening or loosening the threaded fastener causes the resilient block to compress or expand thus allowing adjustment of the angle of the intermediate plate about the axis of the hinge plates with respect to the base plate. The instrument mount plate is similarly attached to the intermediate plate with the axis of the isosceles triangle formed by the three-point mount of the instrument mount plate being rotated 90 degrees from that of the intermediate plate.

9 Claims, 2 Drawing Sheets

ADJUSTABLE TWO-AXIS INSTRUMENT MOUNT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to an adjustable instrument mount for mounting light weight instruments and more particularly to a two-axis adjustable instrument mount having a fixed base plate, an intermediate plate and an instrument mount plate. The intermediate plate is attached to the base plate by a three-point mount. Two of the mounting points include intermediate hinge flex plates fixed to the edge of the intermediate plate and fixed to the mounting plate. The third mounting point has a resilient block allowing adjustment of the angle of the intermediate plate about the axis of the hinge plates with respect to the base plate. The instrument mount plate is similarly attached to the intermediate plate with the axis of the instrument mount hinge plates rotated 90 degrees from that of the intermediate plate.

(2) Description of the Prior Art

Adjustable instrument mounts are well known in the art. Such a mount is required when testing a buoyant test vehicle. In the course of a test, a buoyant test vehicle is released from a point at some depth below the surface of the ocean and allowed to rise vertically to the surface propelled by the vehicles own buoyancy. A compass is mounted within the vehicle to determine pitch, yaw and rotation of the vehicle as it speeds to the surface. In order to set the initial pitch and yaw readings to zero it is necessary to align the compass with respect to the vehicle axis. A prior art mount consisted of a bent plate attached to the vehicle by a screw passing through a slot in the plate. To align the compass with the vehicle axis, the plate was bent and the mount was slid on its mounting screw until the compass was properly aligned with the vehicle axis. The process was time consuming in that adjustment made by bending the plate affected adjustment made by sliding the mount, and vice versa.

Other prior art adjustable mounts provided for adjustment in one direction only. Typical of these types of mounts are tripod camera mounts as in Trebes et al (U.S. Pat. No. 3,704,848) and instrument mounts as in Roser et al (U.S. Pat. No. 5,018,702). In Trebes et al, a mounting plate has a number of feet, at least one of which has an adjusting screw. The plate is placed on a surface and the adjusting screws are turned to obtain the desired orientation of the plate with respect to the surface. In Roser et al, the instrument mount consists of a supporting plate secured to a surface at both ends, one end being fixed, the other end being adjustable toward or away from the surface. The adjustments either toward or away from the surface are accomplished by means of threaded fasteners. The prior art noted lacks the flexibility to quickly adjust the supported instrument in more than one direction as is required for the compass mounting in the buoyant test vehicle.

SUMMARY OF THE INVENTION

Accordingly, it is a general purpose and object of the present invention to provide an instrument mount which is adjustable in two directions.

It is a further object that the adjustment in one direction not affect the adjustment in the other direction.

Another object is that the adjustments can be made quickly and efficiently.

These objects are accomplished with the present invention by providing an instrument mount having a base plate which is affixed to a reference structure. An intermediate adjustable plate is mounted to the base plate by a three-point mount basically in the form of an isosceles triangle. The two mounting points forming the base of the triangle have flexible plates fixed to the intermediate adjustable plate and secured to the base plate by means of stand-offs. The third mounting point has a threaded fastener attached to the base plate and passing through a resilient block placed between the first adjustable plate and the base plate. Movement of the fastener causes expansion or compression of the resilient block and subsequent bending of the flexible plates about an axis parallel to the base of the triangle. A second adjustable plate is mounted to the intermediate adjustable plate in a similar fashion, with the base of the triangular mounting for the second plate being rotated 90 degrees from that of the intermediate adjustable plate mounting. The instrument being mounted to the structure is fixed to the second adjustable plate. The adjustable mount thus described provides for adjustment of the orientation of the instrument about two mutually perpendicular axes by simple loosening or tightening of the fasteners passing through the resilient blocks.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
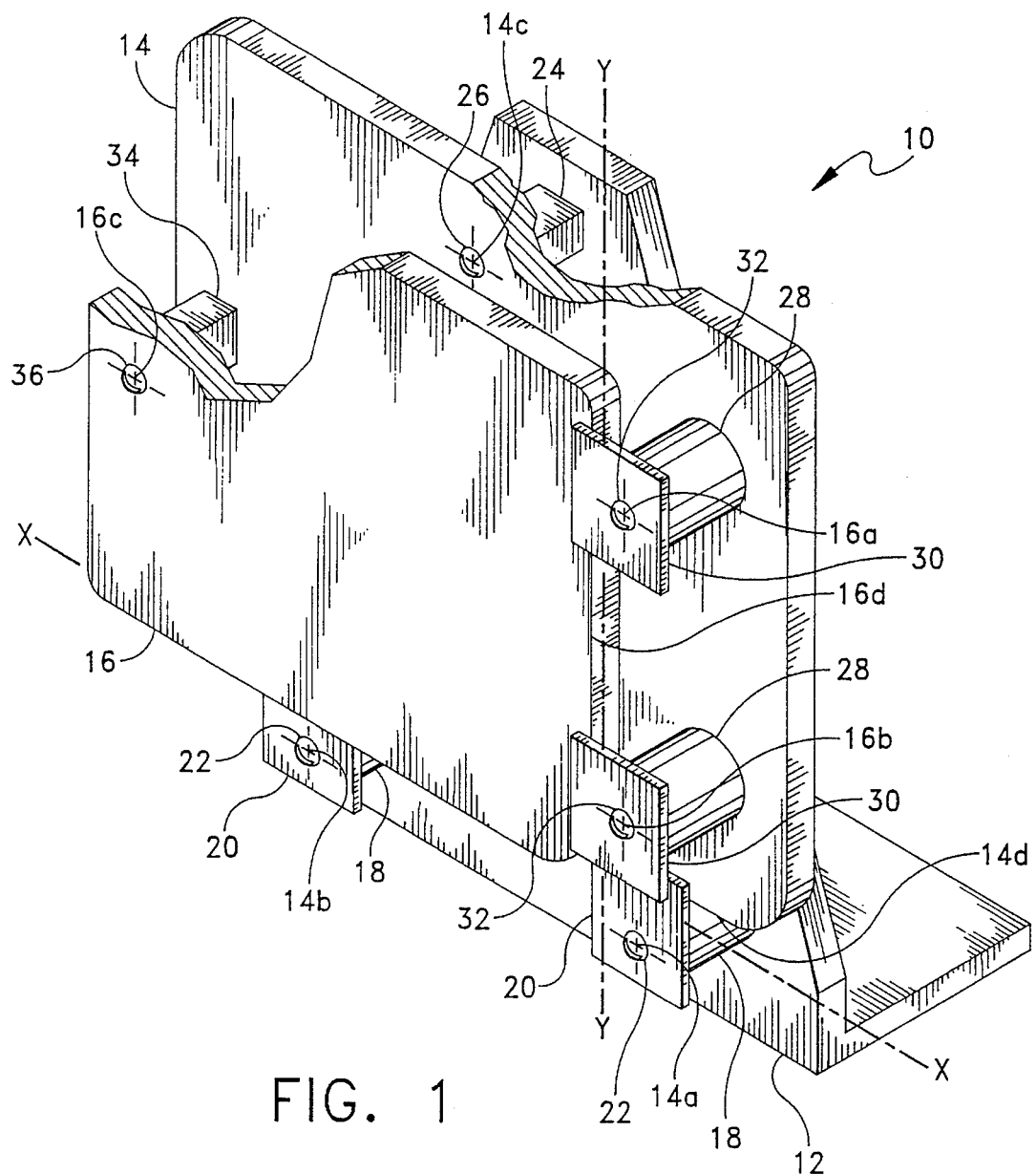
FIG. 1 is an isometric cut-away view of the adjustable two-axis instrument mount of the present invention.

Referring now to FIG. 1, there is shown a isometric view of a preferred embodiment of adjustable instrument mount 10. Instrument mount 10 includes base plate 12, intermediate adjustable plate 14 and second adjustable plate 16. Intermediate adjustable plate 14 is attached to base plate 12 at base mounting points 14a and 14b and at first resilient mounting point 14c. A portion of intermediate plate 14 is cut away to show the features at first resilient mounting point 14c. Mounting points 14a–c are in the shape of an isosceles triangle with base mounting points 14a and 14b forming the base of the triangle and mounting point 14c at the apex of the two equal legs. Rigid stand-off blocks 18 are securely attached to base plate 12 at locations corresponding to base mounting points 14a and 14b. First flexible plates 20 are attached to edge 14d of intermediate plate 14, at locations corresponding to base mounting points 14a and 14b. First flexible plates 20 are secured to stand-off blocks 18 by threaded fasteners 22 passing through flexible plates 20 and threading into blocks 18. First flexible plates 20 are preferably made of thin spring steel which when flexed, form a hinge between base plate 12 and intermediate adjustable plate 14 along axis X—X. Axis X—X is seen to be parallel to the base of the triangle formed by mounting points 14a–c. First resilient block 24 is located between base plate 12 and intermediate plate 14 at resilient mounting point 14c. First resilient block 24 is preferably made of medium density rubber, or the like. First threaded adjustment fastener 26 passes through intermediate plate 14, through resilient block 24 and is threaded into base plate 12 at resilient mounting point 14c to secure intermediate plate 14 to base plate 12. As first adjustment fastener 26 is threaded into base plate 12, first resilient block 24 is compressed, changing the distance between base plate 12 and intermediate plate 14. First flexible plates 20 bend about axis X—X to accommodate the change in distance, thereby providing fine rotational adjustment about axis X—X.

Second adjustable plate 16 is attached to intermediate plate 14 by a three point mount similar to that comprised by mounting points 14a–c. The base of the isosceles triangle formed by intermediate mounting points 16a and 16b is transverse to that formed by base mounting points 14a and 14b. A portion of second plate 16 is cut away to show the features at second resilient mounting point 16c. Rigid intermediate stand-off blocks 28 are securely attached to intermediate plate 14 at locations corresponding to intermediate mounting points 16a and 16b. Second flexible plates 30 are attached to edge 16d of second adjustable plate 16, at locations corresponding to intermediate mounting points 16a and 16b. Second flexible plates 30 are secured to intermediate stand-off blocks 28 by intermediate threaded fasteners 32 passing through second flexible plates 30 and threading into intermediate stand-off blocks 28. Second flexible plates 30 are also preferably made of thin spring steel which when flexed, form a hinge between intermediate plate 14 and second adjustable plate 16 along axis Y—Y. Axis Y—Y is seen to be parallel to the base of the triangle formed by intermediate mounting points 16a–c. Second resilient block 34 is located between intermediate plate 14 and second adjustable plate 16 at second resilient mounting point 16c. Second resilient block 34 is also preferably made of medium density rubber, or the like. Second threaded adjustment fastener 36 passes through second adjustable plate 16, through second resilient block 34 and is threaded into intermediate plate 14 at second resilient mounting point 16c to secure second adjustable plate 16 to intermediate plate 14. As second adjustment fastener 36 is threaded into intermediate plate 14, second resilient block 34 is compressed, changing the distance between intermediate plate 14 and second adjustable plate 16. Second flexible plates 30 bend about axis Y—Y to accommodate the change in distance, thereby providing fine rotational adjustment about axis Y—Y.

Figure 2:
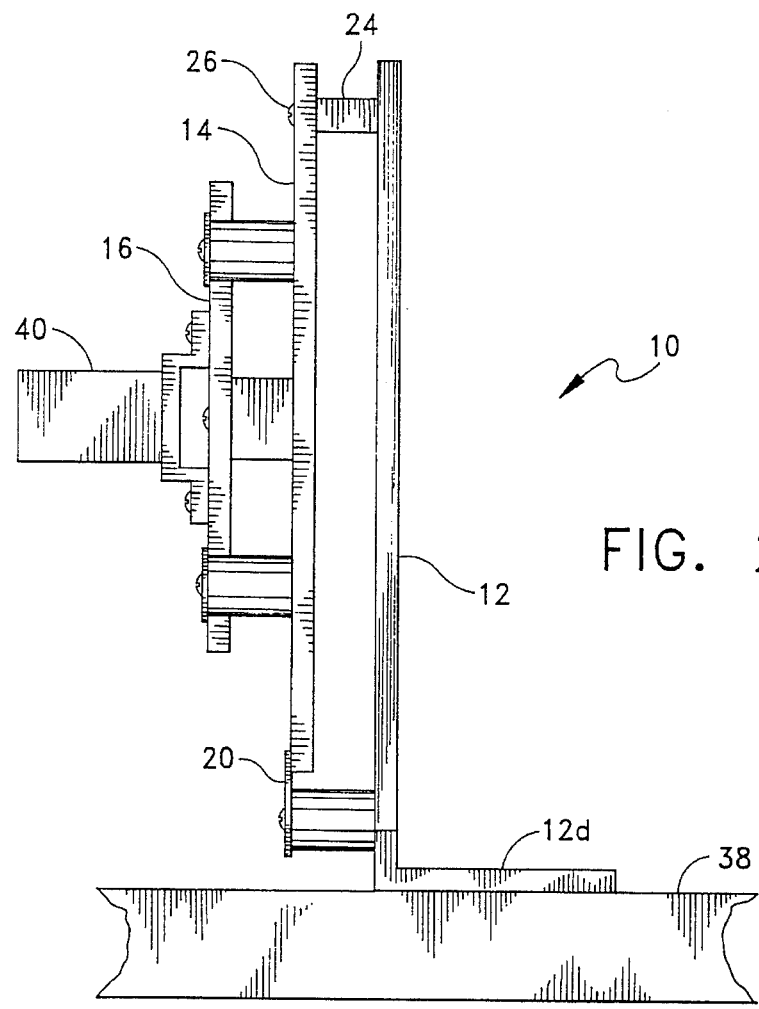
FIG. 2 is a side view of the adjustable two-axis instrument mount of the present invention.

Referring now to FIG. 2, there is shown a side view of the adjustable instrument mount 10 looking along axis X—X of FIG. 1. Base plate 12 has a flange 12d affixed to structure 38. Instrument 40 is affixed to second adjustable plate 16. Adjustment about axis X—X is accomplished by turning first adjustment fastener 26 and compressing or expanding first resilient block 24. First flexible plate 20 bends to accommodate the change in the angle between intermediate plate 14 and base plate 12.

Figure 3:
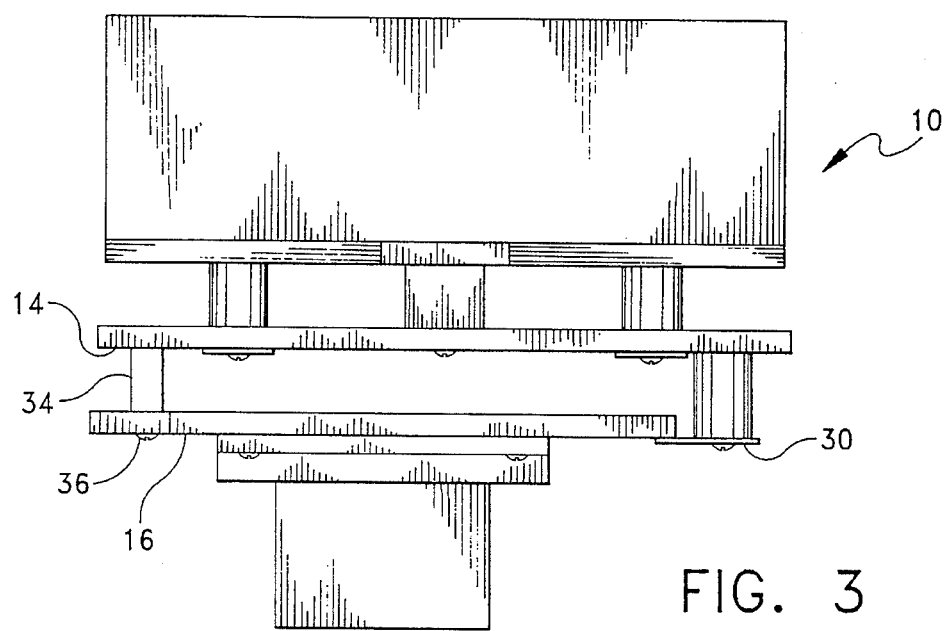
FIG. 3 is a top view of the adjustable two-axis instrument mount of the present invention.

Referring now to FIG. 3, there is shown a top view of the adjustable instrument mount 10 looking along axis Y—Y of FIG. 1. Adjustment about axis Y—Y is accomplished by turning second adjustment fastener 36 and compressing or expanding second resilient block 34. Second flexible plate 30 bends to accommodate the change in the angle between second adjustable plate 16 and intermediate plate 14.

The assembly of the present invention has many advantages over the prior art. The instrument can be adjusted about any of two mutually perpendicular axes by a simple turning of an adjustment fastener. Adjustment about one axis does not affect adjustment about the other axis. Resilient blocks 24 and 34 provide sufficient force against the fastener to prevent loosening. The double three point mounts provide a stable platform for attaching an instrument to a structure.

What has thus been described is a two-axis adjustable instrument mount for mounting a light weight instrument to a structure. The mount has a fixed base plate attached to the structure, an intermediate plate attached to the base plate and a second or instrument mount plate attached to the intermediate plate. The instrument is attached to the instrument mount plate. The attachment of the intermediate plate to the base plate and the attachment of the instrument mount plate to the intermediate plate each comprise three-point mounts in the shape of isosceles triangles. For the intermediate plate attachment, the two mounting points corresponding to the base of the triangle include flexible plates fixed to the edge of the intermediate plate and fixed to the base plate. The third mounting point has a resilient block allowing adjustment of the angle of the intermediate plate about the axis of the hinge plates with respect to the base plate, the axis being parallel to the base of the triangle formed by the three-point mount. The instrument mount plate is similarly attached to the intermediate plate with the three-point mount of the instrument mount plate rotated 90 degrees from that of the intermediate plate.

Obviously many modifications and variations of the present invention may become apparent in light of the above teachings. For example, the flexible plates can be replaced with hinges, preferably spring hinges. When the instrument will be mounted at a specific location on the structure, the structure itself may serve as the base plate. Any method of attachment for the flexible plates may be used, such as riveted, bolted, or welded. The stand-offs may also be attached in any of several ways, such as gluing or cementing, or the fastener used to attach the flexible plates to the stand-off can extend through the stand-off to a threaded hole in the underlying plate. Additionally, the base plate can be attached to the structure using a mount similar to the three-point mounts used for the intermediate and instrument mount plates. This would allow the mount to be adjustable about three mutually perpendicular axes.

In light of the above, it is therefore understood that within the scope of the appended claims, the invention may be practiced otherwise than as specifically described.

What is claimed is:

1. A two-axis adjustable mount comprising:

a base plate:

an intermediate plate;

at least two first hinge point mounts for fixedly attaching the intermediate plate to the base plate, the first hinge point mounts allowing rotation of the intermediate plate relative to the base plate about an axis X—X, the first hinge point mounts being located along the axis X—X;

a first adjustable mount located a distance away from and transverse to said axis X—X for adjustably securing the intermediate plate to the base plate, whereby a distance between the intermediate plate and the base plate measured at the first adjustable mount may be adjusted, the adjustment of the distance between the intermediate plate and the base plate causing the rotation of the intermediate plate about the axis X—X;

each of the first hinge point mounts further comprising a first flexible plate removably affixed between the base plate and the intermediate plate, said first flexible plate bending in response to the rotation of the intermediate plate about the axis X—X;

an instrument mount plate for securing an instrument thereto;

at least two second hinge point mounts for fixedly attaching the instrument mount plate to the intermediate plate, the second hinge point mounts allowing rotation of the instrument mount plate relative to the intermediate plate about an axis Y—Y, the axis Y—Y being perpendicular to the axis X—X, the second hinge point mounts being located along the axis Y—Y;

a second adjustable mount located a distance away from and transverse to said axis Y—Y for adjustably securing the instrument mount plate to the intermediate plate, whereby a distance between the instrument mount plate and the intermediate plate measured at the second adjustable mount may be adjusted, the adjustment of the distance between the instrument mount plate and the intermediate plate causing the rotation of the instrument mount plate about the axis Y—Y; and each of the second hinge point mounts further comprising a second flexible plate removably affixed between the intermediate plate and the instrument mount plate, said second flexible plate bending in response to the rotation of the instrument mount plate about the axis Y—Y.

2. The two-axis adjustable mount of claim 1 wherein:

each of the first hinge point mounts further comprises a first rigid stand-off interposed between the intermediate plate and the base plate for maintaining a certain distance between the intermediate plate and the base plate at the first hinge point mounts; and each of the second hinge point mounts further comprises a second rigid stand-off interposed between the instrument mount plate and the intermediate plate for maintaining a certain distance between the instrument mount plate and the intermediate plate at the second hinge point mounts.

3. The two-axis adjustable mount of claim 1 wherein:

the first adjustable mount further comprises a first resilient block interposed between the intermediate plate and the base plate, the first resilient block being compressed when the distance between the intermediate plate and the base plate is decreased, the first resilient block expanding when the distance between the intermediate plate and the base plate is increased; and the second adjustable mount further comprises a second resilient block interposed between the instrument mount plate and the intermediate plate, the second resilient block being compressed when the distance between the instrument mount plate and the intermediate plate is decreased, the second resilient block expanding when the distance between the instrument mount plate and the intermediate plate is increased.

4. The two-axis adjustable mount of claim 3 wherein:

the first adjustable mount further comprises a first adjusting fastener for securing the intermediate plate to the base plate, the first adjusting fastener having a first head end bearing against a face of the intermediate plate removed from the base plate, the first adjusting fastener having a first threaded shank passing through the intermediate plate, further passing through the first resilient block and threaded into the base plate; and the second adjustable mount further comprises a second adjusting fastener for securing the instrument mount plate to the intermediate plate, the second adjusting fastener having a second head end bearing against a face of the instrument mount plate removed from the intermediate plate, the second adjusting fastener having a second threaded shank passing through the instrument mount plate, further passing through the second resilient block and threaded into the intermediate plate.

5. The two-axis adjustable mount of claim 4 wherein:

each of the first hinge point mounts further comprises a first rigid stand-off interposed between the intermediate plate and the base plate for maintaining a certain distance between the intermediate plate and the base plate at the first hinge point mounts; and each of the second hinge point mounts further comprises a second rigid stand-off interposed between the instrument mount plate and the intermediate plate for maintaining a certain distance between the instrument mount plate and the intermediate plate at the second hinge point mounts.

6. The two-axis adjustable mount of claim 1 wherein:

the first flexible plate of each of the first hinge mounts further comprises a threaded fastener passing through the first flexible plate and threading into the first rigid stand-off for securing the first flexible plate to the first rigid stand-off; and the second flexible plate of each of the second hinge mounts further comprises a threaded fastener passing through the second flexible plate and threading into the second rigid stand-off for securing the second flexible plate to the second rigid stand-off.

7. The two-axis adjustable mount of claim 5 wherein:

the first flexible plate of each of the first hinge mounts further comprises a threaded fastener passing through the first flexible plate and threading into the first rigid stand-off for securing the first flexible plate to the first rigid stand-off; and the second flexible plate of each of the second hinge mounts further comprises a threaded fastener passing through the second flexible plate and threading into the second rigid stand-off for securing the second flexible plate to the second rigid stand-off.

8. The two-axis adjustable mount of claim 7 wherein the first and second resilient blocks are hard rubber.

9. The two-axis adjustable mount of claim 8 wherein:

the first flexible plate of each of the first hinge mounts is spring steel; and the second flexible plate of each of the second hinge mounts is spring steel.

* * * * *